(12) United States Patent
Foley

(10) Patent No.: US 8,007,120 B2
(45) Date of Patent: Aug. 30, 2011

(54) SAFETY FLAG

(75) Inventor: Stephen Foley, Costa Mesa, CA (US)

(73) Assignee: SRS Safety Concepts, LLC, Huntington Beach, CA (US)

( * ) Notice: Subject to any disclaimer, the term of this patent is extended or adjusted under 35 U.S.C. 154(b) by 275 days.

(21) Appl. No.: 12/351,833

(22) Filed: Jan. 10, 2009

(65) Prior Publication Data

US 2010/0177517 A1  Jul. 15, 2010

(51) Int. Cl.
*F21V 7/18* (2006.01)
(52) U.S. Cl. ........... 362/84; 362/103; 362/540; 362/278

(58) Field of Classification Search .............. 362/84, 362/103, 540, 542, 278; F21V 7/22, 7/18
See application file for complete search history.

(56) References Cited

U.S. PATENT DOCUMENTS

| | | | |
|---|---|---|---|
| 6,832,847 B2 * | 12/2004 | Frosythe et al. | 362/473 |
| 6,963,275 B2 * | 11/2005 | Smalls | 340/473 |
| 7,220,011 B2 * | 5/2007 | Hurwitz | 362/84 |

* cited by examiner

*Primary Examiner* — Anabel M Ton
(74) *Attorney, Agent, or Firm* — Steven Laut

(57) ABSTRACT

A safety flag includes reflective material, a light source and a controller. The safety flag meets legal requirements when used for extended loads in vehicles in day and night use.

18 Claims, 4 Drawing Sheets

SAFETY FLAG

BACKGROUND

1. Field

The embodiments relate to safety flags, and in particular to safety flags including highly reflective material and lighting.

2. Description of the Related Art

Safety flags are required by state and federal laws on loads that extend a vehicles length and/or width. Typically, when a safety flag is required, a rag or plastic flag is placed on a load to enable other motorists and pedestrians to see the extended load. These "flags" or markers, however, typically do not meet the requirements of state and federal regulations/laws. Further, these rags or plastic material flags only work to apprise other motorists and pedestrians during daylight.

BRIEF DESCRIPTION OF THE DRAWINGS

The embodiments are illustrated by way of example, and not by way of limitation, in the figures of the accompanying drawings and in which like reference numerals refer to similar elements and in which.

DETAILED DESCRIPTION

The Embodiments discussed herein generally relate to a safety flag including highly reflective material and a light source. Referring to the figures, exemplary embodiments will now be described. The exemplary embodiments are provided to illustrate the embodiments and should not be construed as limiting the scope of the embodiments.

Figure 1:
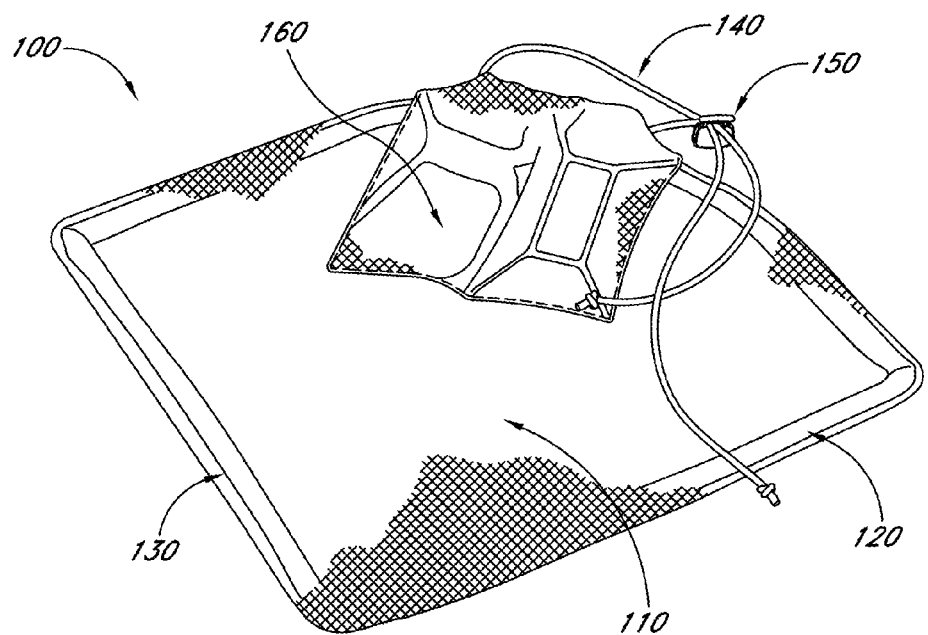
FIG. 1 illustrates one embodiment of a safety flag.

FIG. 1 illustrates one embodiment of a safety flag. In one embodiment safety flag 100 includes a first side 110, reflective material 120, light source 130, an optional fastener 140 with a fastener lock 150 and an optional pocket 160. In one embodiment, safety flag 100 has a square shape where each side is approximately 12 inches long. In another embodiment, each side is approximately 18 inches long to comply with transportation laws. Other embodiments can have different shapes (e.g., round, diamond, rectangular, etc.) for different uses. The embodiments of safety flag 100 are square shaped when used for indicating and warning of an extended load in a vehicle to comply with either state or federal transportation laws. Other shapes can be used for other purposes, such as illuminating a person or animal (e.g., dog, horse, etc.) at night, illuminating a distressed vehicle, use on a boat at night or in fog, use for emergency personnel (e.g., fireman, police, etc.), advertising, use as a flare, use for a warning such as a pot-hole, sink hole, downed object (e.g., a tree limb, line, etc.), etc.

In one embodiment first side 110 is made of acrylic coated marine polyester that is highly abrasion resistant, water repellent and conditioned to prevent stretching and shrinking. In this embodiment first side 110 is UV and mildew resistant. In another embodiment, first side 110 is tear proof and weather resistant. In one embodiment, first side 110 is colored for safety with colors, such as red, orange or yellow. In other embodiment, first side 110 is made of other material, such as canvas or tarp material. In still other embodiments, the first side 110 may be made of different materials based on type of use, environment, etc.

In one embodiment fastener 140 has an ⅛ inch diameter of high elasticity, composite shock cord that consists of numerous tightly packed, synthetic rubber strands that run the entire length of the cord; jacketed with a strong, abrasion resistant, braided nylon casing. In this embodiment fastener 140 is mold, mildew and UV resistant. In this embodiment fastener 140 is capable of stretching about 108% of its original length. In other words; a piece 12 inches long will stretch to a full 25 inches. The length of fastener 140 can vary, such as 1 foot, 3 foot, 5 feet, etc. Other embodiments can have varying diameter, such as ¼ inch, ½ inch etc. In some embodiments, fastener 140 is made of a non-elastic material, such as nylon cord, rope, etc. based on the type of use.

In one embodiment fastener lock 150 is molded from Delrin® high strength plastic consisting of a spring loaded body with a hole to accept elastic cord or other cordage. In this embodiment fastener lock 150 holds fastener 140 tight until released by squeezing the top and bottom. In another embodiment fastener lock 150 can use other known adjustable locking means, clamping means, fastening means, such as clips, snaps, wire locks, etc.

In one embodiment pocket 160 is made of nylon pack cloth. In one embodiment pocket 160 is Denier® urethane coated, waterproof nylon, weighing approximately 6.8 ounces per square yard. In another embodiment, pocket 160 is made of the same material as first side 110. Pocket 160 may have one or more compartments. In one embodiment, pocket 160 is sized to stow a majority of safety flag 100 when safety flag 100 is folded over and into pocket 160. At least one compartment in pocket 160 can store controller/inverter 310 (see FIG. 3). In one embodiment pocket 160 stores a storage bag made of the same or similar material as pocket 160. In this embodiment, when safety flag 100 is not in use it can be folded and stored in the storage pocket. In other embodiments, other similar material is used. In some embodiments different materials may be used based on the use of the safety flag 100. In one embodiment spare batteries, battery packs, etc. may also be stored in pocket 160.

In one embodiment reflective material 120 is made of 3M® Scotchlite reflective fabric tape cloth. In this embodiment, reflective material 120 is sewn on reflective fabric tape cloth fabric that is composed of wide angle exposed retroreflective lenses bonded to a durable material cloth backing. In one embodiment reflective material 120 is red or orange when not reflecting light and appears bright white when reflecting light. Table I lists the different properties of this embodiment. In other embodiments, similar reflective material is used. In some embodiments different reflective material may be used based on the type of use and environment.

TABLE I

| | |
|---|---|
| Day Color | 8986 NFPA Flame retardant: Neon Red-Orange |
| Reflection Color | White |
| Cut cloth using scissors? | YES |
| Width | ½ inch 1 inch 1.5 inch or 2 inch |
| reflective fabric cloth composition | 65% polyester-35% cotton |
| Original Reflectivity | ANSI Level 2 |

TABLE I-continued

| Wash | Machine wash warm |
|---|---|
| Dry | Tumble dry low |
| Iron | Use medium iron |
| Dry Clean | Dry clean normal cycle |
| Reflective Viewing distance | over 1000 feet |

Figure 6:
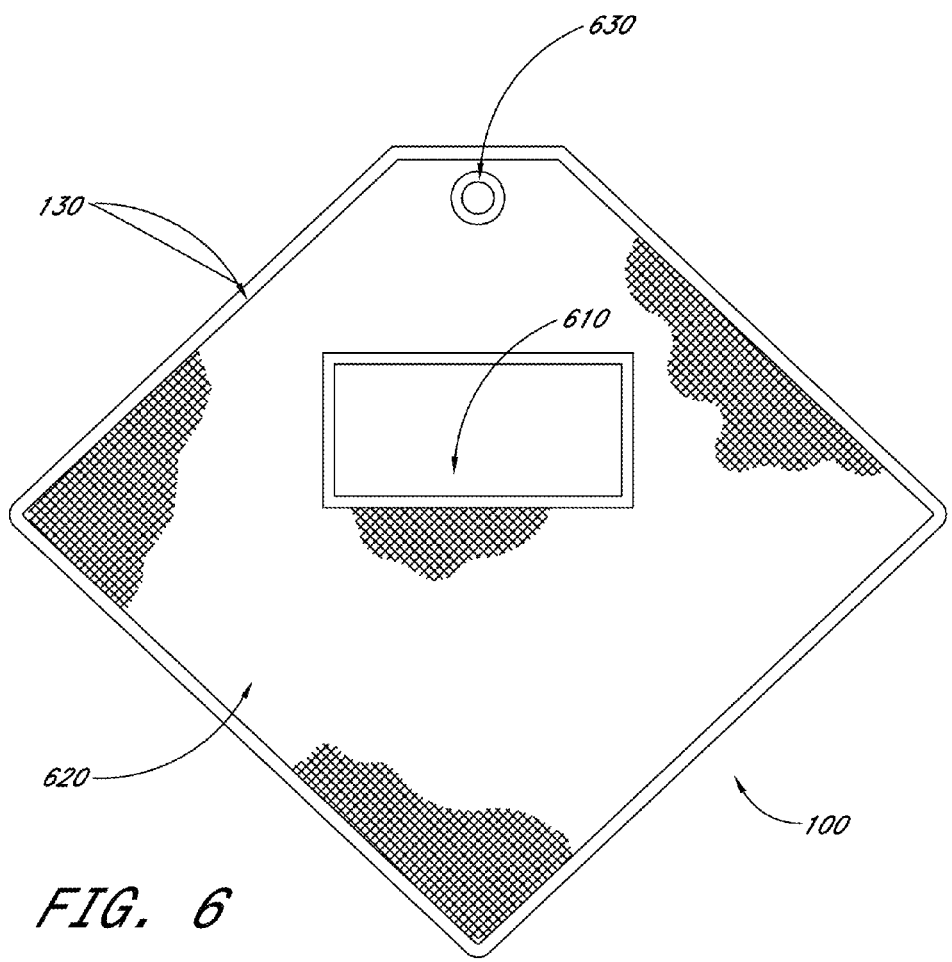
FIG. 6 illustrates a side of the embodiment illustrated in FIG. 1 with an optional graphic or wording.

In one embodiment, reflective material 120 is positioned on safety flag 100 such that part of reflective material 120 is on first side 110 and part of reflective material 120 is on second side 620 (see FIG. 6). In another embodiment reflective material 120 is only disposed on either first side 120 or second side 620. In still another embodiment, reflective material covers either all of the perimeter of first side 120, second side 620 or both first side 120 and second side 620. In one embodiment, reflective material 120 is a reflective paint that is painted on safety flag 100.

In one embodiment light source 130 is electroluminescent tail El wire. In one embodiment light source 130 is about 3.2 mm El wire with a thin plastic tail running alongside the El wire allowing it to be sewn, stapled or adhered easily. In one embodiment, light source 130 is disposed on the perimeter of safety flag 100 such that light source 130 can be seen from either first side 110 or second side 620 (see FIG. 6). In one embodiment light source 130 is positioned on most or all edges of safety flag 100. In one embodiment light source 130 is positioned on reflective material 120. In yet another embodiment, light source 130 is positioned next to reflective material 120. Light source 130 is easily visible when illuminated by a power source (such as controller/inverter 310 (see FIG. 3 and FIG. 5) including one or more batteries or rechargeable devices. Light source 130 can be any color depending on application, such as red, orange, amber, white, etc. In one embodiment light source 130 is one continuous piece (i.e., one piece of tail wire). In another embodiment, light source 130 is more than one piece of tail wire (e.g., 2, 4, etc.). In this embodiment, different colors and/or different patterns of light can be illuminated from light source 130. In other embodiments, similar lighting sources may be used.

Figure 2:
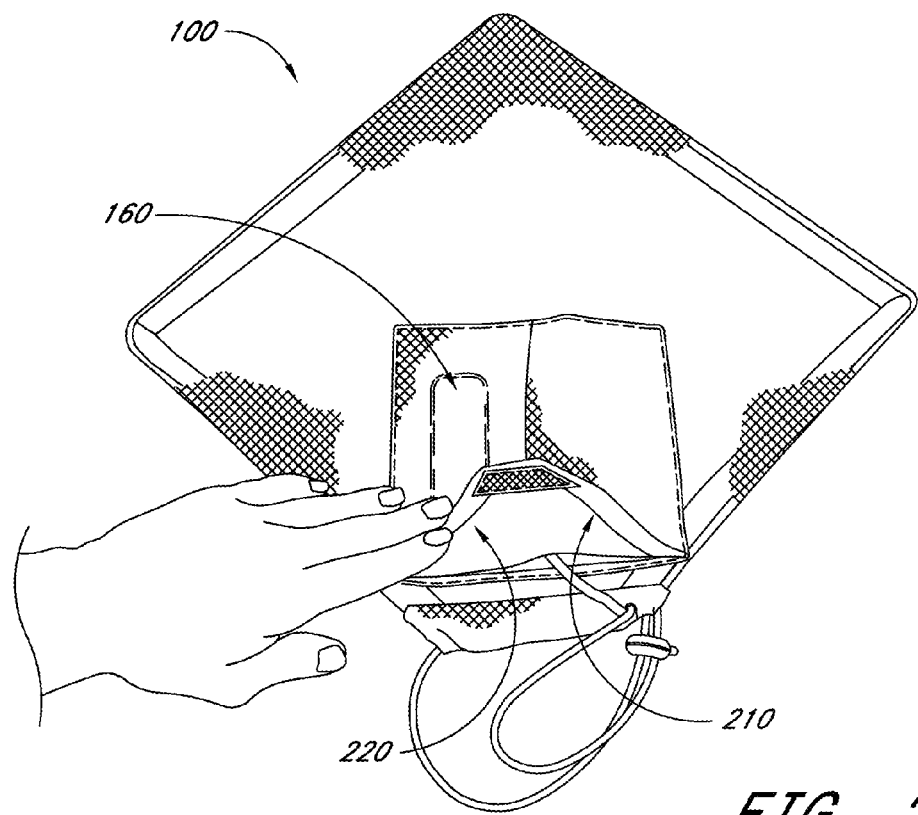
FIG. 2 illustrates the embodiment shown in FIG. 1 showing an open pocket.

FIG. 2 illustrates pocket 160 with a cover/flap 220 in an open position. In one embodiment, pocket 160 is closed by cover/flap 220 folded onto fastening means 210. In one embodiment fastening means 210 is a hook and loop fastener. In one embodiment fastening means 210 is either a sewn on type or adhesive type hook and loop fastener that couples with its opposing hook or loop fastening means disposed on cover/flap 220. In another embodiment, other fastening means is attached to pocket 160, such as snaps, zipper, etc.

Figure 3:
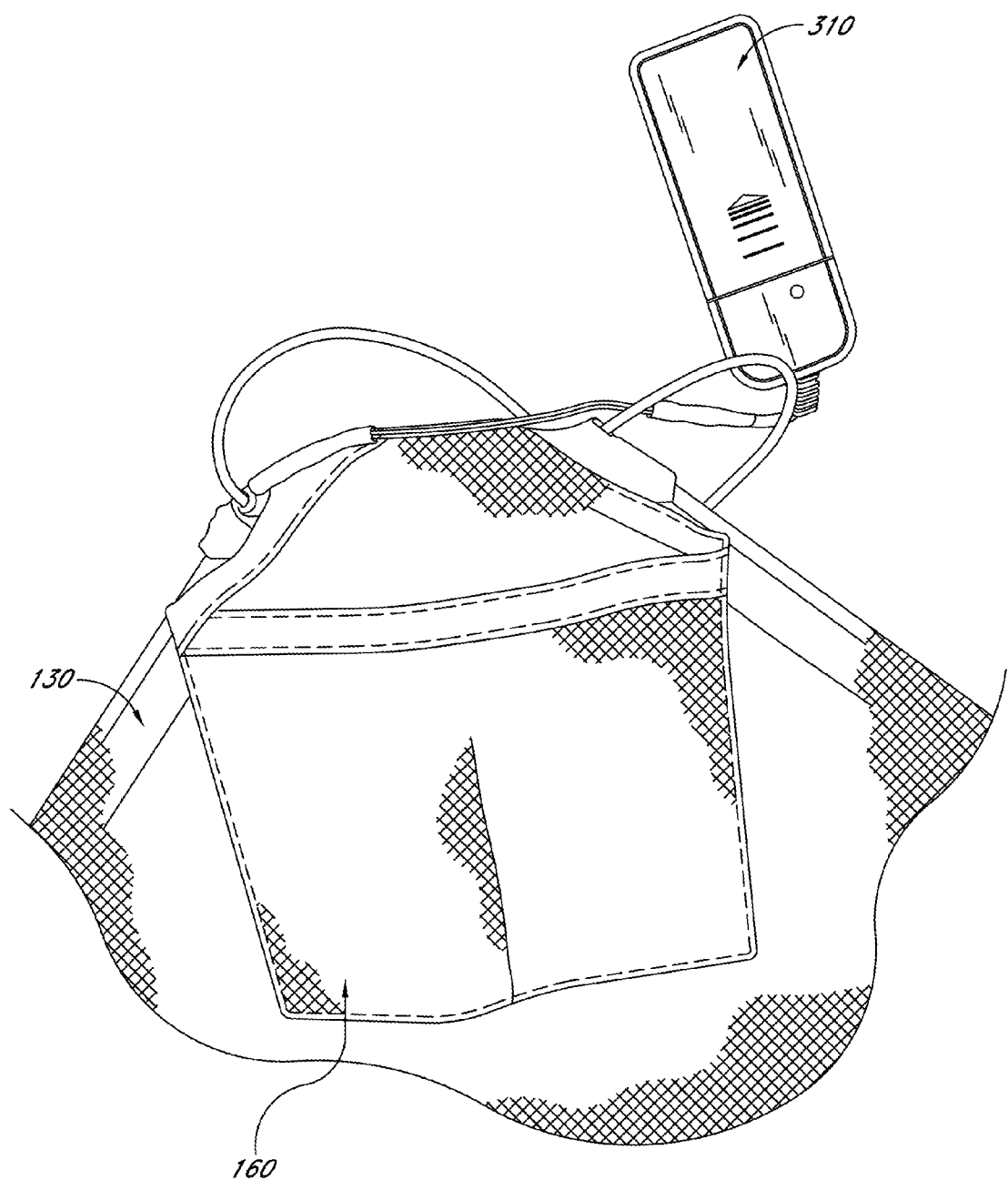
FIG. 3 illustrates the embodiment shown in FIG. 1 showing a power source.

FIG. 3 illustrates controller 310 out of pocket 160. In one embodiment controller 310 is a small, handheld inverter powered by 2 'AA' batteries. In one embodiment controller 310 has a side sliding switch, with constant on, flash and off options. In one embodiment controller 310 is roughly 2½ inches×1 inch×1 inch. The controller 310 powers light source 130. In another embodiment, controller 310 includes an on/off switch such as a slide switch, push button switch, etc. and simply transfers power from batteries to light source 130. In yet another embodiment, controller 310 does not include any switches and illuminates light source 130 when batteries are placed in controller 310. In one embodiment controller 310 controls different patterns of illumination in light source 130. In one embodiment controller 310 may include an interface to accept a DC in source. In this embodiment the DC source may be an AC/DC converter, another DC source, such as from a cigarette lighter connector, etc. In another embodiment the controller includes rechargeable batteries or a rechargeable device. In one embodiment a hand-use generator is connected to the controller to generate and store energy in a rechargeable device.

Figure 4:
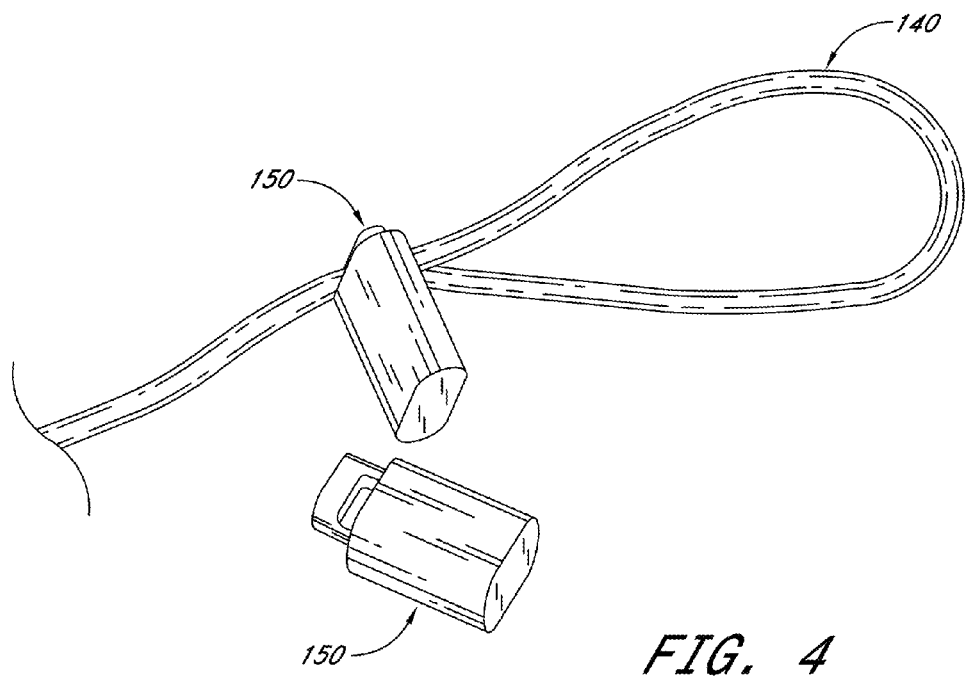
FIG. 4 illustrates a fastener of the embodiment shown in FIG. 1.

FIG. 4 illustrates an isolated view of one embodiment of fastener 140 and fastener lock 150. As illustrated fastener 140 is passed through fastener lock 150 and when the ends are pressed the loop of fastener 140 can be adjusted to tightly be placed around an object of desire, such as an extended load in a vehicle, around a person's clothes, etc. When the ends of fastener lock 150 are released, fastener lock 150 maintains the length of fastener 140.

Figure 5:
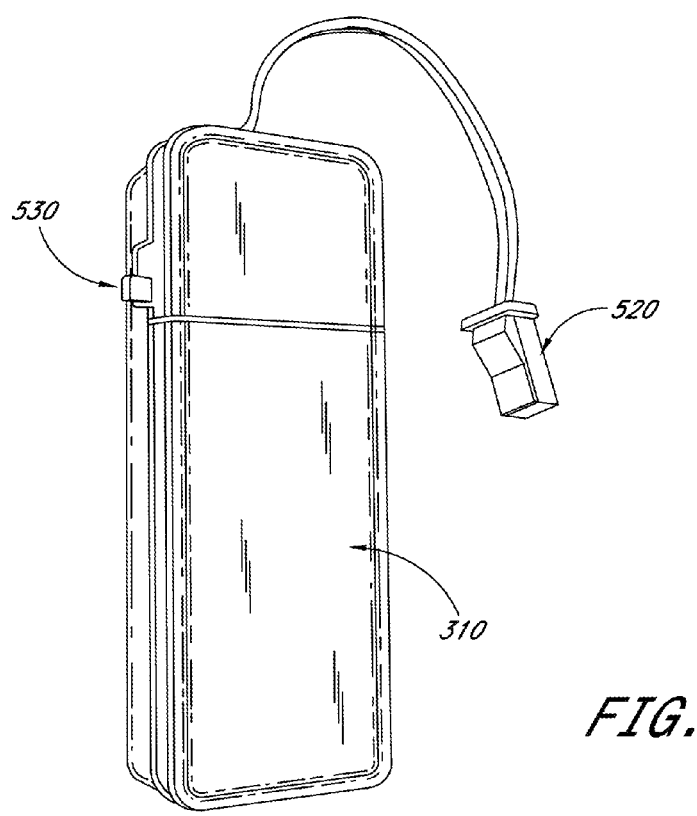
FIG. 5 illustrates a power source and lighting connector for the embodiment shown in FIG. 1.

FIG. 5 illustrates an isolated view of controller/inverter 310. As illustrated, controller/inverter 310 includes switch 530 and coupler 520. In this embodiment, coupler 520 attaches to a coupler that connects to light source 130. Other embodiments may include a simple battery holder without a controller/inverter depending on the light source being used.

FIG. 6 illustrates an embodiment of safety flag 100 including an optional graphics/logo/wording/etc. ("logo") 610. In one embodiment logo 610 is made of similar material as reflective material 120. Logo 610 can be shaped in any desired shape. In this embodiment, logo 610 reflects when light is directed to logo 610. In this embodiment, logo 610 can provide advertising, warnings, sayings, etc. In one embodiment, logo 610 is positioned on first side 110. In another embodiment, logo 610 is positioned on second side 620 (as illustrated). In other embodiments logo 610 is not made of reflective material and is more readily seen in daylight than at night. In this embodiment logo 610 may be seen when safety flag 100 is used during the day or when illuminated with light at night.

In one embodiment safety flag 100 includes a fastening connector 630 that can connect to a fastener, such as a metal wire, hook, ring, etc. In one embodiment fastening connector 630 is a metal grommet. In this embodiment, a fastener, such as a metal fastener, connects to the fastening connector 630 and can be connected to a comparable connection, such as a loop, or a connection that will hold safety flag 100 from coming loose while in motion.

Figure 7:
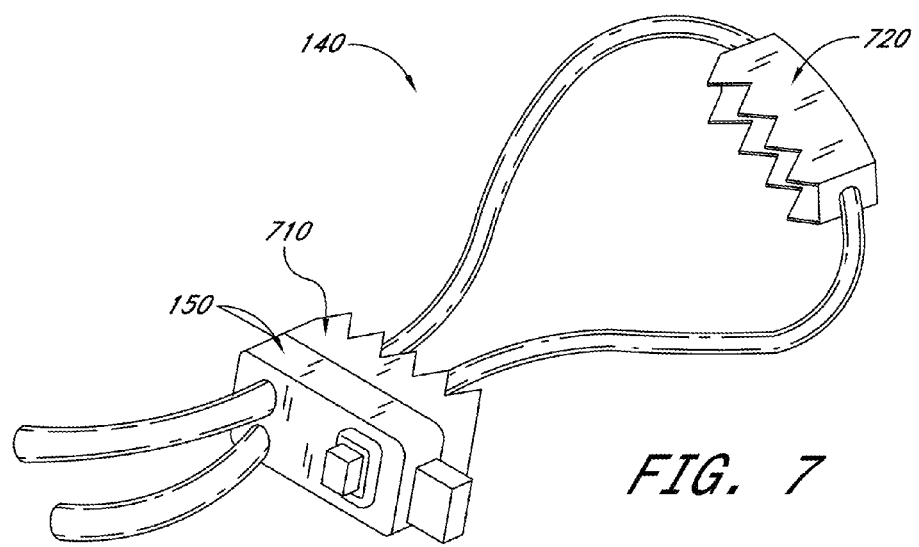
FIG. 7 illustrates the fastener shown in FIG. 4 with optional griping portions.

FIG. 7 illustrates an embodiment with first gripping means 710 connected to fastener lock 150. In another embodiment, a second gripping means 720 is adapted to connect to fastener 140. First and second gripping means 710 and 720 are made of similar material as fastener lock 150. In another embodiment, first and second gripping means 710 and 720 are made of rubber, gel, silicon, etc. In another embodiment, first and second gripping means 710 and 720 are made of metal or a metal alloy. Other embodiments may use other materials for gripping means 710 and 720 depending on the use and material that is gripped, such as wood, metal, hard plastic, PVC, etc.

When safety flag 100 is used for indicating extended loads, some embodiments of safety flag 100 comply with current Federal Department of Transportation (DOT) regulations as regarding size, color and lighting as listed below.

DOT Regulation §393.87 Warning Flags on Projecting Loads
  (a) Any commercial motor vehicle transporting a load which extends beyond the sides by more than 102 mm (4 inches) or more than 1,219 mm (4 feet) beyond the rear must have the extremities of the load marked with red or orange fluorescent warning flags. Each warning flag must be at least 457 mm (18 inches) square.
  (b) Position of flags. There must be a single flag at the extreme rear if the projecting load is two feet wide or less. Two warning flags are required if the projecting load is wider than two feet. Flags must be located to indicate maximum width of loads which extend beyond the sides and/or rear of the vehicle.

Different states can have differing regulations regarding indicating extended loads. Some embodiments of safety flag 100 comply with the different state laws regarding size, color and lighting. For example, some embodiments comply with California Vehicle Codes, such as:

Section 25803.

(a) All vehicles not otherwise required to be equipped with headlamps, rear lights, or reflectors by this chapter shall, if operated on a highway during darkness, be equipped with a lamp exhibiting a red light visible from a distance of 500 feet to the rear of the vehicle. In addition, all of these vehicles operated alone or as the first vehicle in a combination of vehicles, shall be equipped with at least one lighted lamp exhibiting a white light visible from a distance of 500 feet to the front of the vehicle.

(b) A vehicle shall also be equipped with an amber reflector on the front near the left side and a red reflector on the rear near the left side. The reflectors shall be mounted on the vehicle not lower than 16 inches nor higher than 60 inches above the ground and so designed and maintained as to be visible during darkness from all distances within 500 feet from the vehicle when directly in front of a motor vehicle displaying lawful lighted headlamps undimmed.

(c) In addition, if a vehicle described in subdivision (a) or the load thereon has a total outside width in excess of 100 inches there shall be displayed during darkness at the left outer extremity at least one amber light visible under normal atmospheric conditions from a distance of 500 feet to the front, sides and rear. At all other times there shall be displayed at the left outer extremity a solid red or fluorescent orange flag or cloth not less than 12 inches square.

Section 25103

Whenever the load upon any vehicle extends from the left side of the vehicle one foot or more, there shall be displayed at the extreme left side of the load during darkness:

(a) An amber lamp plainly visible for 300 feet to the front and rear of the vehicle.

(b) An amber lamp at the front visible for 300 feet to the front and a red lamp at the rear plainly visible for 300 feet to the rear of the vehicle if the projecting load exceeds 120 inches in length. The lamp shall not contain a bulb rated in excess of six candlepower.

Section 25104

Any vehicle or equipment that requires a permit issued pursuant to Article 6 (commencing with Section 35780) of Chapter 5 of Division 15 because it is wider than permitted under Chapter 2 (commencing with Section 35100) of Division 15 shall display a solid red or fluorescent orange flag or cloth not less than 12 inches square at the extreme left front and left rear of the vehicle or equipment, if the vehicle or equipment is being operated other than during darkness.

Section 24604

Whenever the load upon any vehicle extends, or whenever any integral part of any vehicle projects, to the rear four feet or more beyond the bed or body of the vehicle, there shall be displayed at the extreme end of the load or projecting part of the vehicle during darkness, in addition to the required tail lamp, two red lights with a bulb rated not in excess of six candlepower plainly visible from a distance of at least 500 feet to the sides and rear. At any other time there shall be displayed at the extreme end of the load or projecting part of the vehicle a solid red or fluorescent orange flag or cloth not less than 12 inches square.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
a flag;
a first reflective material coupled to at least a first side of the flag;
an electroluminescent light source coupled to the flag;
a controller coupled to the electroluminescent light source;
a pocket formed on one of the first side and a second side of the flag, the pocket sized to hold the controller; and
a first fastener adapted to couple to a first portion of the flag.

2. The apparatus of claim 1, wherein the flag is made of a tear proof material.

3. The apparatus of claim 2, wherein the tear proof material is acrylic coated marine material.

4. The apparatus of claim 1, wherein the first reflective material is reflective fabric tape cloth.

5. The apparatus of claim 1, wherein the flag is one of 18 inches square and 12 inches square.

6. The apparatus of claim 1, wherein the first fastener comprises shock cord coupled with a cord lock.

7. The apparatus of claim 6, the first fastener further comprising at least one gripping portion.

8. The apparatus of claim 1, wherein the pocket is adapted to stow the flag when not in use.

9. The apparatus of claim 1, further comprising a second reflective material coupled to one of the first side and the second side.

10. The apparatus of claim 9, wherein the second reflective material is in the shape of one of a logo, a trade name and a service name.

11. The apparatus of claim 1, wherein the light source is coupled to at least two edges of the flag, and the controller is an inverter.

12. The apparatus of claim 1, wherein the flag further comprising a second fastener coupled to a second portion of the flag.

13. The apparatus of claim 12, wherein the flag is adapted to be worn by one of a person and an animal.

14. An apparatus comprising:
a flag made of tear proof material having a first side;
a reflective material coupled to the first side;
an electroluminescence light source coupled to a periphery of the flag;
an inverter coupled to the electroluminescence light source; and
a fastener coupled to a first portion of the flag,
wherein the fastener includes an adjustable loop.

15. The flag of claim 14, wherein the flag satisfies department of transportation (DOT) standards for extended loads in night and day use.

16. A safety flag comprising:
a first reflective material coupled to the safety flag;
a light source coupled edges of the flag;
an inverter coupled to the light source;
a first fastener coupled with the safety flag,
wherein the first fastener is coupled with a fastener lock.

17. The safety flag of claim 16, wherein the light source is electroluminescent tail wire.

18. The safety flag of claim 17, wherein the flag further comprising a pocket formed on one of the first side and a second side of the safety flag.

* * * * *